(No Model.)

A. D. WOODMANSEE.
ADJUSTABLE CAM.

No. 403,169. Patented May 14, 1889.

WITNESSES:
Henry J. Stapleton
Allen P. Young

INVENTOR
Alvin D. Woodmansee
by Edson Salisbury Jones
Attorney.

UNITED STATES PATENT OFFICE.

ALVIN D. WOODMANSEE, OF NATICK, RHODE ISLAND.

ADJUSTABLE CAM.

SPECIFICATION forming part of Letters Patent No. 403,169, dated May 14, 1889.

Application filed January 24, 1889. Serial No. 297,426. (No model.)

*To all whom it may concern:*

Be it known that I, ALVIN D. WOODMANSEE, of Natick, in the county of Kent, State of Rhode Island, have invented a new and useful Improvement in Adjustable Cams; and I do hereby declare the following specification, taken in connection with the accompanying drawings, forming a part of the same, to be a description thereof.

This invention relates to a cam capable of being adjusted to produce a greater or lesser throw within certain limits; and the improvement consists in certain features of construction and arrangement hereinafter described and claimed.

Figure 1:
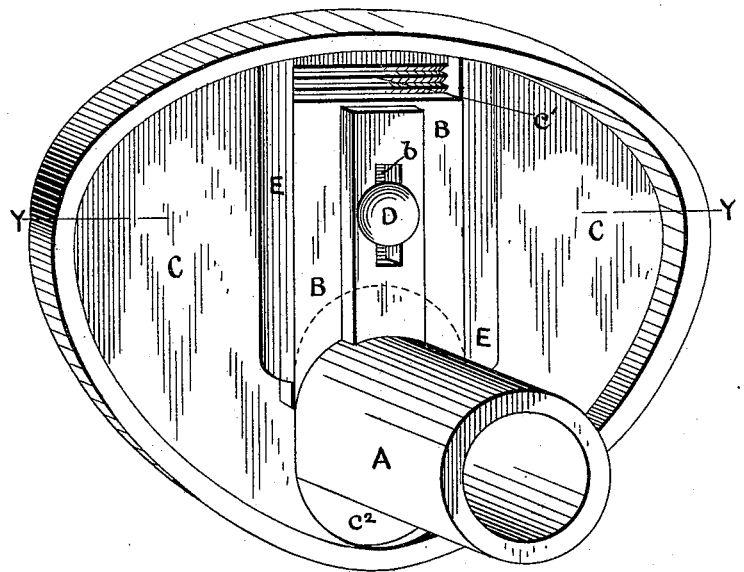
Figure 3:
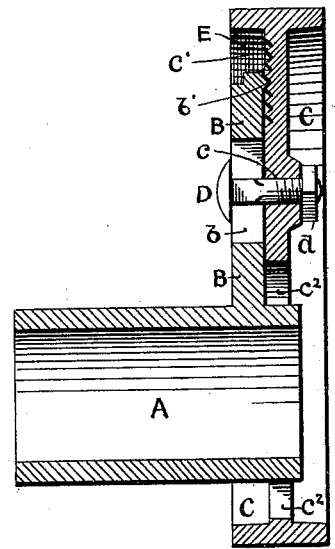
Figure 2:
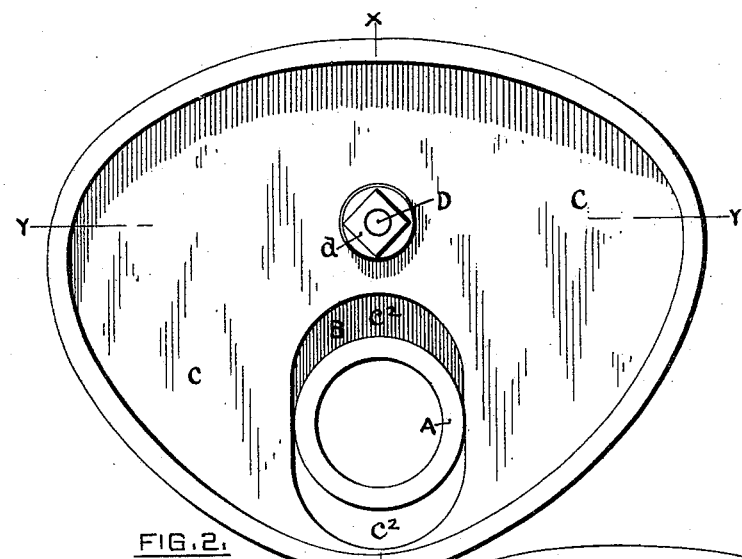
Figure 4:
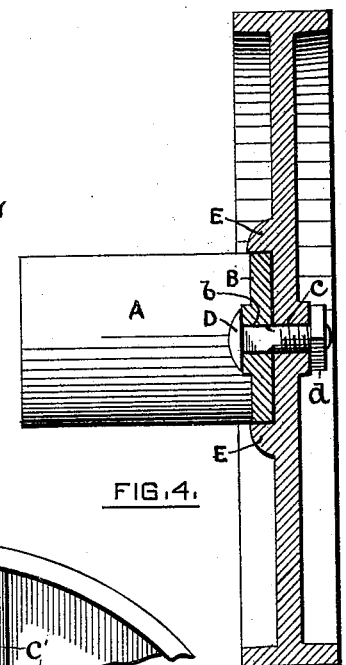
Figure 5:
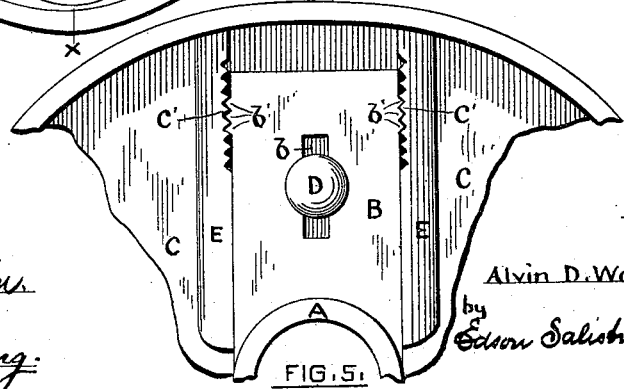

In the drawings, Figure 1 represents in perspective a cam embodying the invention. Fig. 2 shows a view of that side of the cam opposite to that shown in Fig. 1. Fig. 3 is a vertical longitudinal section on line $x\ x$ of Fig. 2. Fig. 4 is a transverse section on line $y\ y$ of Figs. 1 and 2. Fig. 5 shows a side view of a portion of the cam, representing a modified form of toothing.

A is the sleeve or hub of the cam, which hub is adapted to receive a shaft, and is provided with a projecting arm or plate, B.

C is the cam proper, which may be of any preferred form, and is secured to the arm B by a fastening of suitable form—such as a screw or a bolt and nut, D $d$—the arm B having a perforation, $b$, and the cam C a perforation, $c$, to receive the screw or bolt. As shown in the drawings, the hole or perforation $c$ is round, and the perforation $b$ is made a slot, to enable the screw or bolt to slide therein when the cam is adjusted to or from the axis of the hub A; but it will be readily understood that the perforation $c$ may be a slot and the perforation $b$ a round hole; or, in case a bolt and nut are used for fastening, both the perforations may be slots.

The cam C is provided on that side adjacent to the arm B with two projecting ribs, E E, which are intended to engage the sides of the arm B, as shown in Figs. 1, 4, and 5, so as to prevent the cam from turning on the arm by any possibility, although a single rib, E, may be used for such purpose, if desired, as will be readily understood. To assist the fastening in securely holding the cam and arm in a fixed relation to each other, the cam and arm are toothed together, the arm having one or more teeth or corrugations, $b'$, and the cam having teeth or corrugations $c'$, which interlock, as shown in Fig. 3, which teeth or corrugations may be as fine as desired, and may serve also as a gage in adjusting the cam on the arm. If desired, however, the teeth $b'$ may be located on one or both edges of the arm B, and the teeth $c'$ on one or both adjacent faces of the ribs E, as shown in Fig. 5.

To adapt the cam for use upon a shaft at a distance from the end of the latter, the cam is preferably furnished with an opening or hole, $c^2$, which is sufficiently large to allow the passage of the shaft (and also a portion of the hub A, if desired) and to prevent the shaft from interfering with the adjustment of the cam, though if the cam be used on the end of a shaft such hole $c^2$ will not be necessary.

When the cam is to be adjusted for a greater or lesser throw, the fastening is loosened sufficiently to allow the cam to slide upon the arm B when the fastening is properly tightened, thereby causing the teeth or corrugations $b'$ $c'$ to interlock and assist the fastening in securely holding the two parts in the desired relation.

The toothing of the cam and arm to each other will also act to prevent the cam from turning on the arm, and when the strain upon the cam is not too great this toothing may serve the purpose without the employment of the ribs E E to engage the sides of the arm.

What I claim, and desire to secure by Letters Patent, is—

1. The combination of the hub or sleeve having an arm or plate, B, projecting therefrom, and a cam, C, the said arm and cam being provided with teeth and adapted to engage each other, whereby the throw of the cam may be varied and the cam be held in a fixed position on said arm when adjusted, substantially as set forth.

2. The combination of the hub or sleeve having an arm or plate, B, projecting therefrom, and a cam, C, the said arm and cam being provided with teeth and adapted to engage each other, and a rib or ribs, E, located upon the cam for engaging the arm, substantially as set forth.

3. The combination of the hub or sleeve having an arm or plate, B, projecting therefrom, and a cam, C, the said arm and cam being provided with teeth and adapted to engage each other, and the cam having an opening or hole, $c^2$, therein, substantially as and for the purposes specified.

4. The combination, with the hub or sleeve A, having an arm or plate, B, which is perforated, of the cam C, perforated and having a rib or ribs, E, the said cam and arm being provided with teeth and adapted to engage each other, and a fastening passing through the perforations in the arm and cam and adjustably securing the parts to each other, substantially as set forth.

ALVIN D. WOODMANSEE.

Witnesses:
EDSON SALISBURY JONES,
GEO. W. CADY.